United States Patent

Sakamoto et al.

[11] Patent Number: 5,561,796
[45] Date of Patent: Oct. 1, 1996

[54] APPARATUS FOR SEARCHING FOR SPEECH AND MOVING IMAGES

[75] Inventors: Kenji Sakamoto, Chiba; Keiko Watanuki, Toride; Fumio Togawa, Sakura, all of Japan

[73] Assignees: Sharp Kabushiki Kaisha, Osaka; Real World Computing Partnership, Tokyo, both of Japan

[21] Appl. No.: 404,082

[22] Filed: Mar. 14, 1995

[30] Foreign Application Priority Data

Mar. 15, 1994 [JP] Japan .................................. 6-044080

[51] Int. Cl.⁶ .................................................. G06F 17/30
[52] U.S. Cl. .................. 395/600; 364/282.1; 364/282.3; 364/DIG. 1; 386/96
[58] Field of Search .................................. 395/600, 154, 395/100; 360/14.1; 364/419.19, DIG. 1, DIG. 2

[56] References Cited

U.S. PATENT DOCUMENTS

| 4,979,050 | 12/1990 | Westland et al. | 360/14.1 |
| 5,253,361 | 10/1993 | Thurman et al. | 395/600 |
| 5,257,185 | 10/1993 | Farley et al. | 364/419.19 |
| 5,267,351 | 11/1993 | Reber et al. | 395/600 |
| 5,339,166 | 8/1994 | LeBrat et al. | 358/311 |
| 5,400,436 | 3/1995 | Nara et al. | 395/13 |
| 5,404,295 | 4/1995 | Katz et al. | 364/419.19 |
| 5,404,435 | 4/1995 | Rosenbaum | 395/147 |
| 5,428,774 | 6/1995 | Takahashi et al. | 395/600 |

FOREIGN PATENT DOCUMENTS 5-2857  1/1993  Japan .

Primary Examiner—Thomas G. Black
Assistant Examiner—Maria N. Von Buhr

[57] ABSTRACT

A speech and moving image search apparatus includes an input section for inputting a command and a label information storage device for storing label information. A label attribute storage device is further included for storing label attributes, as well as a broader term storage device for storing broader terms of labels. A first search section extracts information on the data from the label information storage device. A database is also included for storing speech and moving images. A control section thereafter accesses desired data in the database based on the information extracted by the first search section. Finally, an output section is included for outputting the data.

8 Claims, 17 Drawing Sheets

FIG. 3

LABEL ATTRIBUTE i
   LABEL NAME 1   LABEL NAME 2  ---------  LABEL NAME n

FIG. 4

```
#task
  uketsuke    janken gesture
  bow    nod    look    pointing expression
  smile    angry    laugh    confuse head
  left    right    up    down    center eye
  contact    eclose mouth
  mopen    mclose speech
  irashai    hai    iie    arigatou
```

FIG. 5

```
      28    29    30       31
    #task
     06565   07475   uketsuke gesture
     06607   06648   bow
     06943   06962   nod
     07015   07082   look
     07210   07263   look
     07274   07285   nod
     07285   07327   look
     07349   07427   pointing
     07436   07475   bow expression
     07266   07421   smile head
     07266   07360   up eye
     06565   06600   contact
     06639   07022   contact
     07102   07219   contact
     07264   07286   contact
     07327   07432   contact mouth
     06643   06674   mopen
     07418   07475   mopen speech
     06608   06630   iraQshai
     06675   06682   hai
     06928   06948   sha-pu
     06974   06985   e-Qto
     06989   07101   chigaimasu
```

APPARATUS FOR SEARCHING FOR SPEECH AND MOVING IMAGES

BACKGROUND OF THE INVENTION

1. Field of the Invention

The present invention relates to a speech and moving image apparatus for searching for a desired portion from recorded data of speech and moving images.

2. Description of the Related Art

A recording/reproduction/editing apparatus for images and speech has been proposed which records image and speech information of a conference, attaches marks to scenes necessary for recording, and searches for necessary information in reproduction by using such marks as a key (Japanese Patent Application Laying Open No. 5-2857).

The recording/reproduction/editing apparatus for images and speech comprises, as shown in FIG. 14, an input device 1 consisting of a camera, a microphone, and the like for inputting image and speech information; a recording device 2 for recording the image and speech information sent from the input device 1; an editing device 3 for editing the image and speech information recorded in the recording device 2; a search device 4 for finding the necessary information by reproducing the recorded information at a high speed; a reproduction device 5 for reproducing the recorded information at a normal speed; an output device 6 consisting of a television, a speaker, and the like for outputting the recorded image and speech information; a controller 7, and a console 8 for controlling processing and delivery of information between these devices.

The operation of the conventional recording/reproduction/editing apparatus for images and speech is described in the following sections. Progress of a conference is input with images and speech by the input device 1. The images and speech are recorded by the recording device 2. The recorded image and speech information is reproduced by the reproduction device 5, and is output to the output device 6. The editing device 3 attaches marks to any positions in the image and speech information saved in the recording device 2. Each mark is added with character information. The added information is saved in the recording device 2. The image information is reproduced by the search device 4 in fast-forward mode, added to the information created by the editing device 3 as telops, and displayed on the output device 6. Portions where information supplied by high-speed reproduction is insufficient are reproduced at normal speed. This enables it to understand an outline of the record, and to confirm necessary portions in detail.

In addition, there is a search method in which speech data is digitized by an A/D converter so as to be accessible by a computer, the waveform and the frequency spectrum of the speech data is displayed on the screen of the computer, predetermined phonemic labels are recorded at the starting and ending position of the speech data, and the speech data is searched using the label as a key as required.

However, the conventional recording/reproduction/editing apparatus for images and speech and the search method have such disadvantages that they can search for only either one event of speech and/or moving image, and cannot search for a desired scene such as a scene desired to be searched where a person is nodding while saying "yes."

The present invention is intended to eliminate such problems, and to provide a speech and moving image search apparatus which can search for a desired scene.

SUMMARY OF THE INVENTION

According to the present invention, the above and other objects can be attained by a speech and moving image search apparatus comprising a database for storing the speech and moving image data by frame as the minimum time unit, a label attribute storage means for storing attribute information of labels which is for labeling the speech and moving image data stored in the database by frame, a label information storage means for storing label information in which the speech and moving image data stored by frame is labeled in a plurality of different events based on the attribute information of labels stored in the label attribute storage means, a broader term storage means for storing broader terms which is for searching for the labels by OR or AND search, an input means for inputting a command for specifying the broader term, a search means for searching for the label information from the label information storage means based on the broader term stored in the broader term storage means in response to the specified command, a controller means for accessing the database for the speech and moving image data corresponding to the label information searched for by the search means, and an output means for outputting the speech and moving image data accessed from the database.

According to the present invention, the above and other objects can also be attained by a speech and moving image search apparatus comprising an input means for inputting the speech and moving image data by frame as the minimum time unit, a feature parameter storage means for storing each feature parameter corresponding to the prelabeled respective speech and moving image data, a matching means for matching the speech and moving image data input by the input means with the feature parameter stored in the feature parameter storage means, and for outputting labels corresponding to the matched feature parameter only when predetermined conditions are met, a broader term storage means for storing broader terms which is for searching for the labels by OR or AND search, a search means for accepting the labels output from the matching means, and for searching the broader terms for the labels from the broader term storage means, and an output means for outputting the broader terms searched for by the search means.

According to the first speech and moving image search apparatus of the present invention, the speech and moving image data is stored by frame as the minimum time unit by the database. The label information is stored by the label information storage device, the label attribute storage device stores the label attribute. Further, the broader term of the label is stored by the broader term storage device and, the speech and moving images are stored by the database. In searching for data, when a command is input through the input device, label information on the data is extracted by the search device through reference to the broader term storage device. The database being accessed for the speech and moving image data corresponding to the label information by the control device. Finally, output device outputs the speech and moving image data. A desired scene can be easily searched for with an OR or AND type search simply by inputting a predetermined command corresponding to the broader term.

According to the second speech and moving image search apparatus of the present invention, the speech and moving image data is input by frame as the minimum time unit by the input device. Each feature parameter corresponding to the prelabeled respective speech and moving image data are stored in the feature parameter storage means and the broader term for searching the label with an OR or AND type search is stored in the broader term storage device. The matching means matches the speech and moving image data input from the input device with the feature parameter stored in the feature parameter storage device, and outputs the label corresponding to the matched feature parameter only when predetermined conditions are met, while the search device accepts the label. It then searches for the broader term of the label from the broader term storage device, and searched-for broader term is output by the output device. Therefore, it is possible to easily search for the broader term for the input speech and moving image data.

Further objects and advantages of the present invention will be apparent from the following description of the preferred embodiments of the present invention as illustrated in the accompanying drawings.

BRIEF DESCRIPTION OF THE DRAWINGS

FIG. 3 is a configuration of label attribute data according to the present invention.

FIG. 4 is an example of the label attribute data according to the present invention.

FIG. 5 is an example of the label attribute data according to the present invention.

DESCRIPTION OF THE PREFERRED EMBODIMENTS

An embodiment of the first speech and moving image search apparatus of the present invention will be explained with reference to the drawings.

Figure 1:
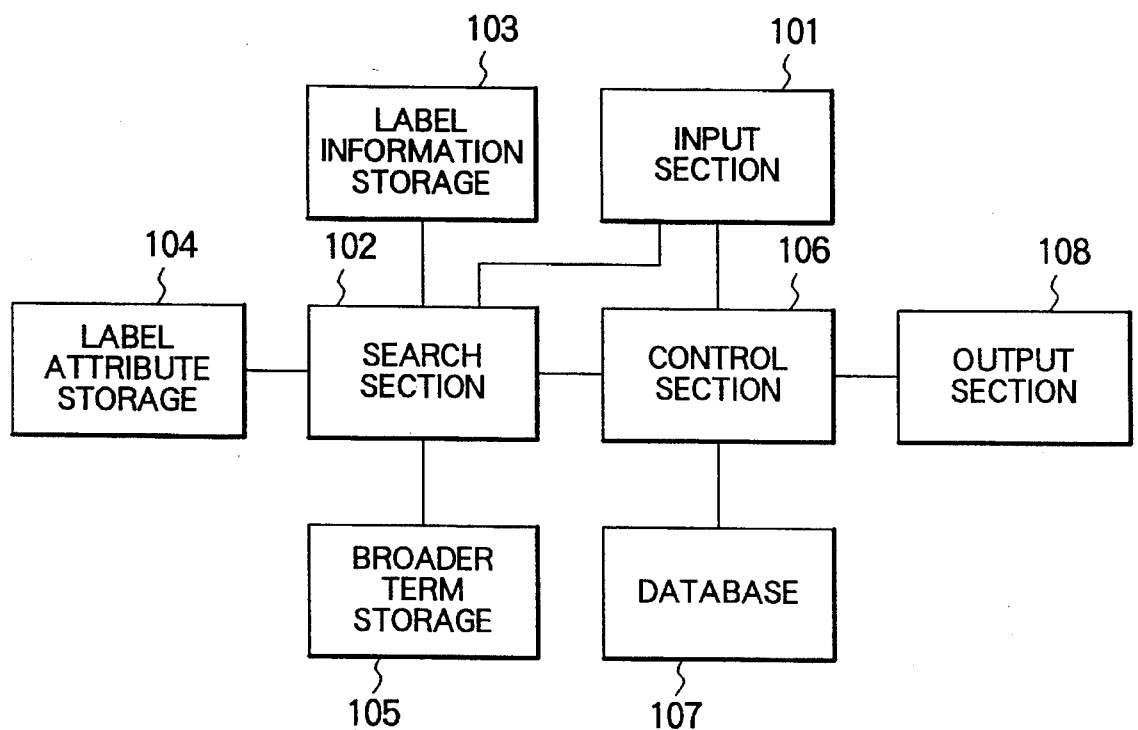
FIG. 1 is a block diagram showing the arrangement of a first speech and moving image search apparatus according to the present invention.

The first speech and moving image search apparatus includes, as shown in FIG. 1, an input section 101 as an input means (for example) for inputting a command and the like; a label information storage 103 as a label information storage means (for example) for storing label information; a label attribute storage 104 as a label attribute storage means (for example) for storing label attributes; a broader term storage 105 as a broader term storage means (for example) for storing broader terms of the labels; a search section 102 as a first search means (for example) for extracting information on the data from the label information storage 103; a database 107 for storing speech and image data; a control section 106 as a control means (for example) for accessing desired data from the database 107 based on the information extracted from the search section 102; and an output section 108 as an output means (for example) for outputting the data from the database 107.

Figure 2:
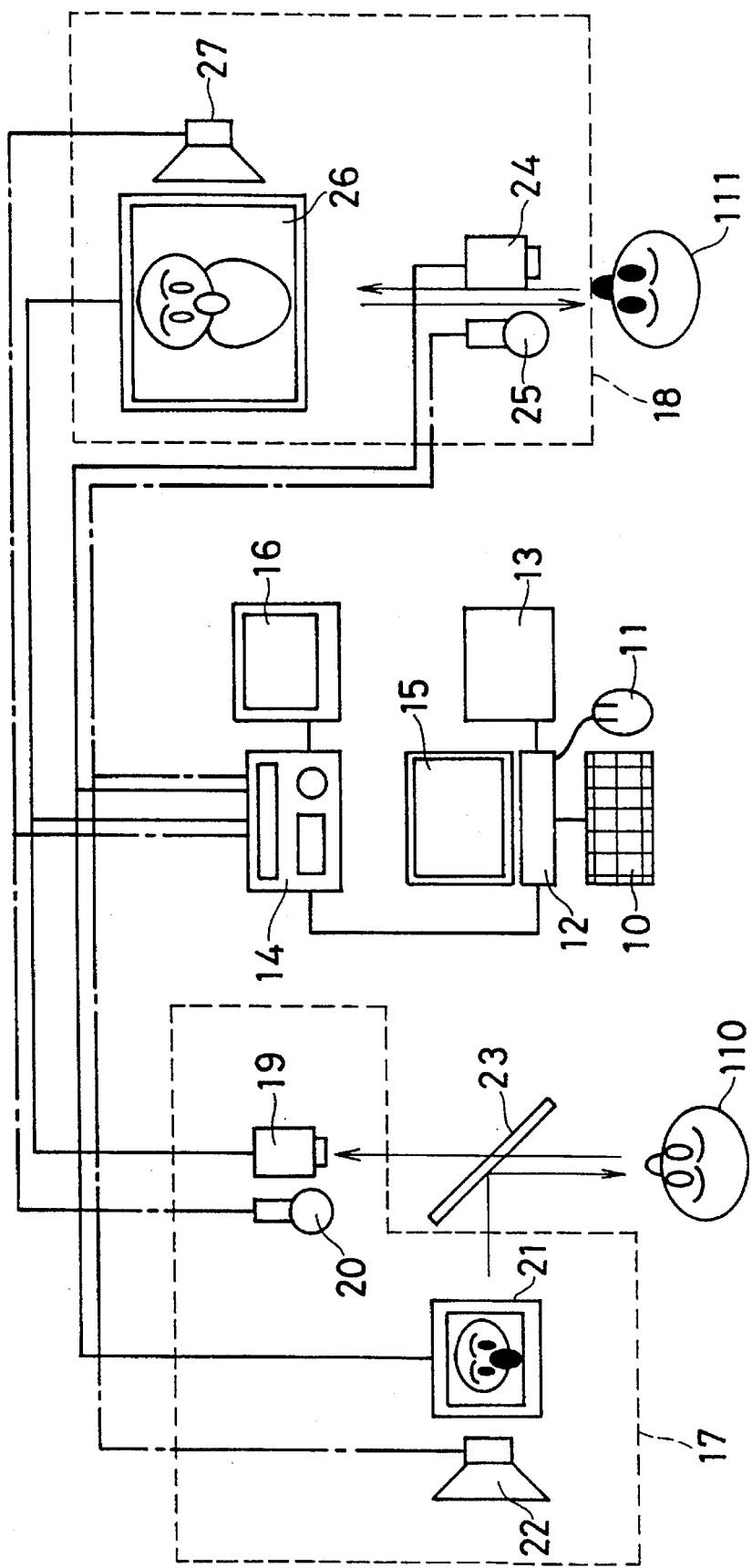
FIG. 2 is a schematic diagram showing the arrangement of a recording/reproduction/editing apparatus for images and speech for which the first speech and moving image search apparatus according to the present invention is used.

Referring to FIG. 2, there is shown the actual system configuration of a recording/reproduction/editing apparatus for images and speech to which the speech and moving image search apparatus is applied. The input section 101 consists of a keyboard 10 and a mouse 11. The search section 102 and the control section 106 are contained in the housing of a computer unit 12. Attached to the computer unit 12 are a magnetic disk 13, which commonly serves as the label information storage 103, the label attribute storage 104, and the broader term storage 105, a magneto-optical disk 14 serving as the database 107, and a display 15. Attached to the magneto-optical disk 14 are a monitor 16 serving as the output section 108, an input/output device 17 located at a receptionist 110, and an input/output device 18 located at a person to be monitored 111. The input/output device 17 includes a camera 19, a microphone 20, a monitor 21, and a speaker 22.

A half-mirror 23 is placed in front of the receptionist 110. When the receptionist 110 views the half-mirror 23, he or she can answer to the person to be monitored 111 displayed on the monitor 21 as if he or she directly faces that person. Similarly, the input/output device 18 includes a camera 24, a microphone 25, a monitor 26, and a speaker 27.

The voice of the person to be monitored 111 is output to the speaker 22 at the receptionist 110 through the microphone 25, while the figure of the person to be monitored 111 is taken by the camera 24 and output to the monitor 21 at the receptionist 110. Similarly, the voice of the receptionist 110 is output to the speaker 27 at the person to be monitored 111 through the microphone 20, while the figure of the receptionist 110 is taken by the camera 19 and output to the monitor 26 at the person to be monitored 111. When the receptionist 110 views the person to be monitored displayed on the monitor 21 through the half-mirror 23, because the line of sight of the receptionist 110 is directed to the camera 19 through the half-mirror 23, the receptionist 110 displayed on the monitor 26 also appears to see the person to be monitored 111. The image of the receptionist 110 is taken as if the camera is placed on the line of sight of the receptionist 110 to the monitor 21 by placing the half-mirror 23 in front of the monitor 21.

The voice of the person to be monitored ill picked up by the microphone 25, the image of the figure of the person to be monitored 111 shot by the camera 24, the voice of the receptionist 110 picked up by the microphone 20, and the image of the figure of the receptionist 110 shot by the camera 19 are recorded on the magneto-optical disk 14. The magneto-optical disk 14 is controlled for writing and reproduction by a workstation including a keyboard 10, a mouse 11, a computer unit 12, a magnetic disk 13, and a display 15. The speech and moving images in reproduction are output to the monitor 16. The data such as the label information, label attribute, and broader term have been written to the magnetic disk 13. The keyboard 10 and the mouse 11 are provided for allowing input of a command and the like.

The label attribute is described in the following sections.

The label attribute data, as shown in FIG. 3, has a symbol # followed by an attribute name which represents different events. FIG. 3 describes the i-th attribute.

An event means, for example, the action of which a portion of the body is being noticed. Following the attribute name, there are label names which label different gestures in the attribute. For example, they represent differences of gestures by a person.

For the label attributes, as shown in FIG. 4, the first attribute "task" represents the task of data which includes labels of "uketsuke" (task for reception) and "janken" (task for matching paper, scissors, and stones to determine a choice). The second attribute "gesture" represents the gesture of a person which includes labels of "bow," "nod," "look" (looking memo), and "pointing." The third attribute "expression" represents the expression of a person which includes labels of "smile"(smiling), "angry," "laugh"(laughing), and "confuse"(confused). The fourth attribute "head" represents in which direction the head of a person is directed which includes labels of "left," "right," "up," "down," and "center." The fifth attribute "eye" represents in which direction the line of sight of a person is directed which includes labels of "contact" (looking at the other person) and "eclose" (the eyes being closed). The sixth attribute "mouth" represents the state of the mouth of a person which includes labels of "mopen" (the mouth being opened) and "mclose" (the mouth being closed). The seventh attribute "speech" represents the content of the speech spoken by a person which includes labels of "irasshai" (meaning "welcome" in Japanese), "hai" (meaning "yes" in Japanese), "iie" (meaning "no" in Japanese"), and "arigatou" meaning "thanks" in Japanese).

The label information is described, as shown in FIG. 5, on the line following each attribute name 28 in the sequence of the start frame 29, the end frame 30, and the label name 31 for each label. The name defined in the label attribute is used as the label name. The start frame 29 and end frame 30 here represent the frame numbers of data recorded on the magneto-optical disk 14. For example, in the attribute name "gesture," the frame numbers from 6943 to 6962 represent "nod."

The arrangement on the screen relating to the labeling and search to be displayed on the display 15 will be described by referring to FIG. 6.

Figure 6:
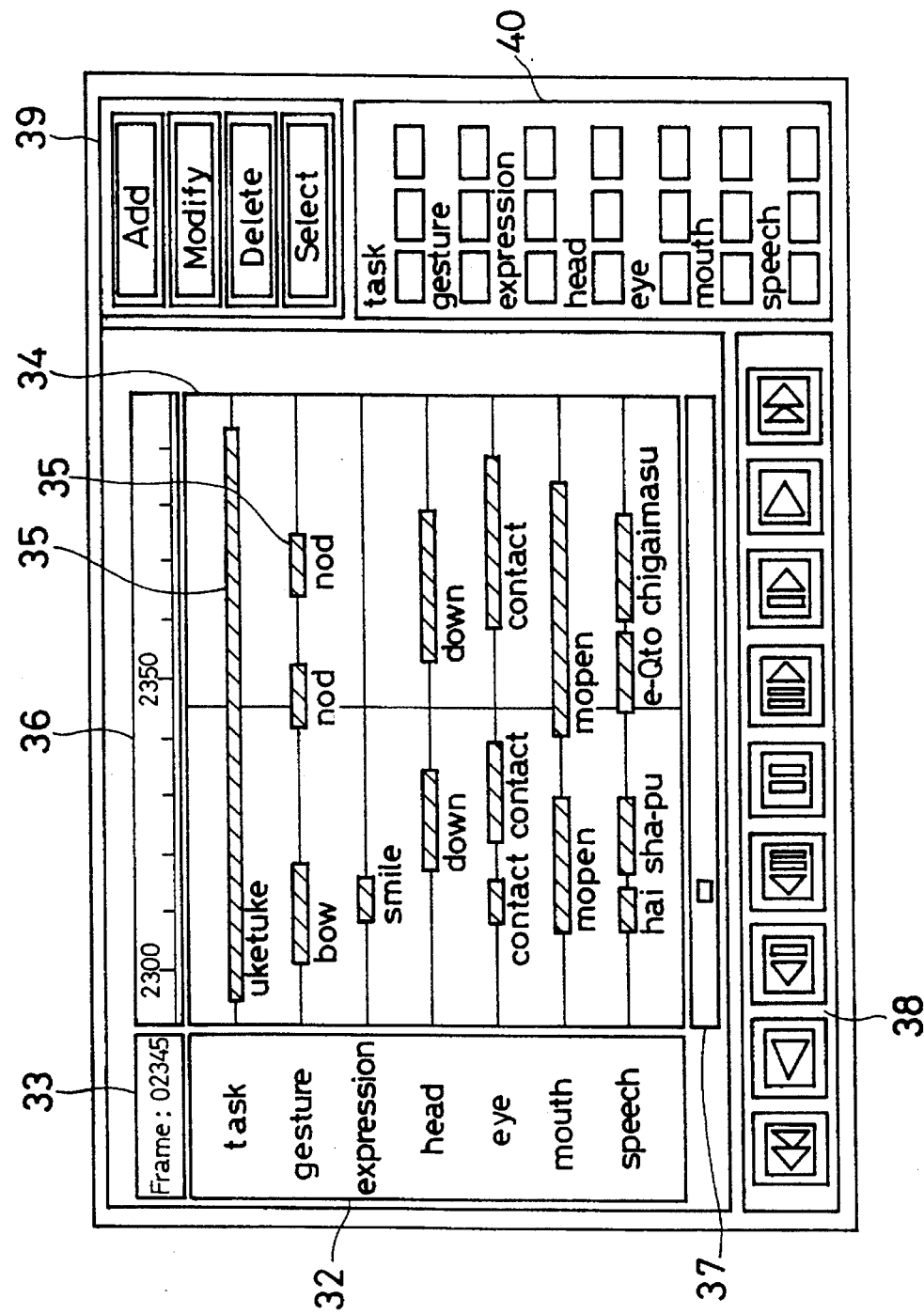
FIG. 6 is an example of the arrangement on the screen displayed on a display.

In FIG. 6, an attribute information window 32 displays the label attributes. In the example shown, there is displayed information on seven label attributes, namely, "task," "gesture," "expression," "head," "eye," "mouth," and "speech." A reproduction frame window 33 displays the current frame of the magneto-optical disk 14 being reproduced. A label information window 34 displays the labels of each label attribute in correspondence to the frame. The labels are linearly arranged on a line for each attribute. The region from the start frame to the end frame indicating the position of the label is represented by a rectangle 35. A frame window 36 displays a range of frames including the frame displayed in the label information window 34. A frame cursor 37 allows a change in the time frame seen from the label information window 34 by laterally moving a bar being displayed. In this case, the scale and values of the frame window 36 are arranged to be moved in interlocking action with such movement.

Operation buttons 38 are for controlling the magneto-optical disk 14, and include buttons of the following functions from the left-most button: fast reverse reproduction, normal reverse reproduction, slow reverse reproduction, reverse jog feed, stop, jog feed, slow reproduction, normal reproduction, and fast reproduction. The buttons for fast reverse reproduction, fast reproduction, reverse jog feed, and jog feed function operate as long as they are pressed. Each of the other buttons starts its function once it is pressed and continues to function until another button is pressed. Command buttons 39 are used to Add, Modify, or Delete the label information, or to Select it. Label select buttons 40 are used to provide a label with a label name, or to specify a label.

The label information window 34 will be described in detail with reference to FIG. 7 in the following sections.

Figure 7:
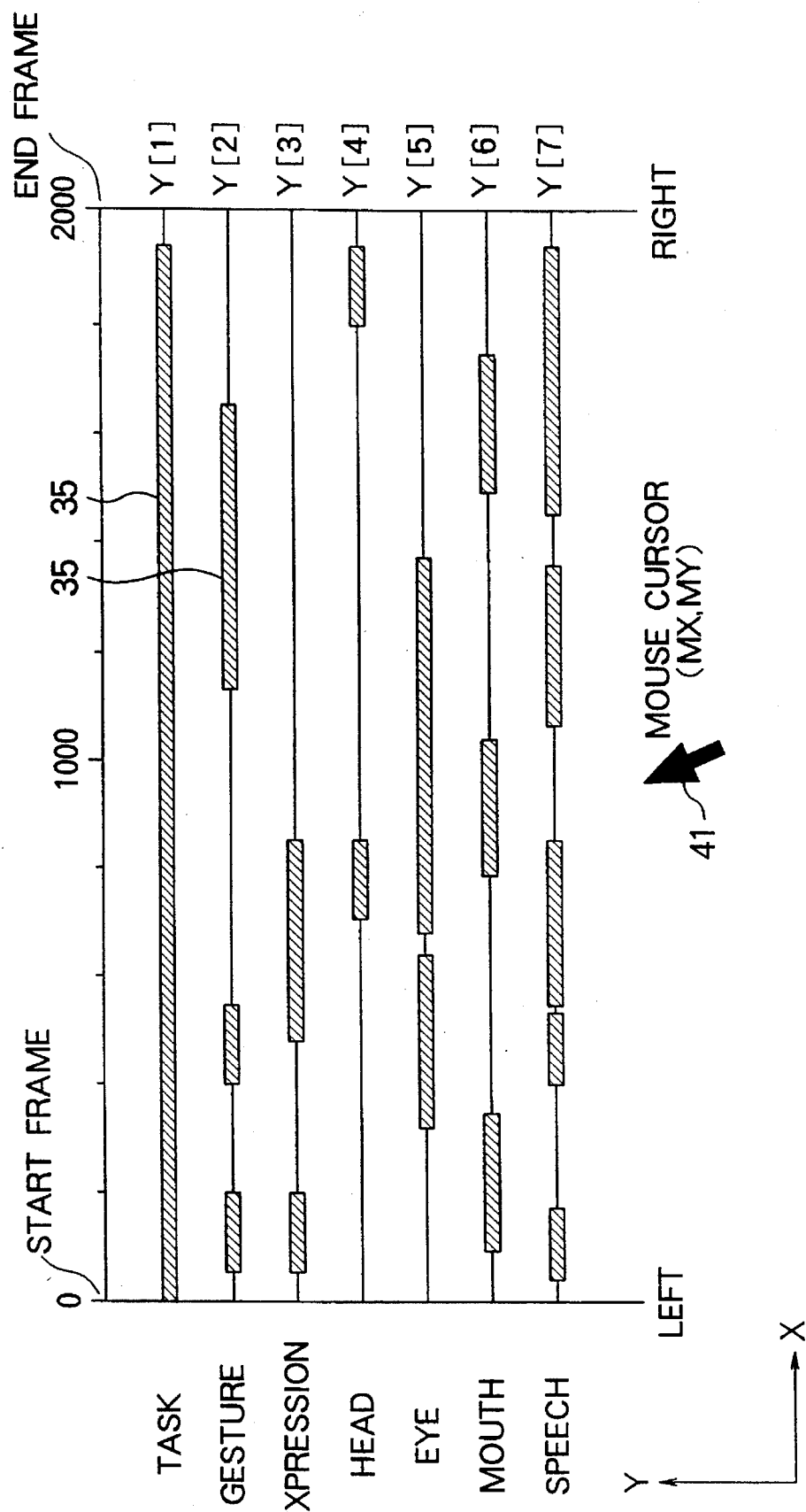
FIG. 7 is a diagram for illustrating a label information window.
Figure 8:
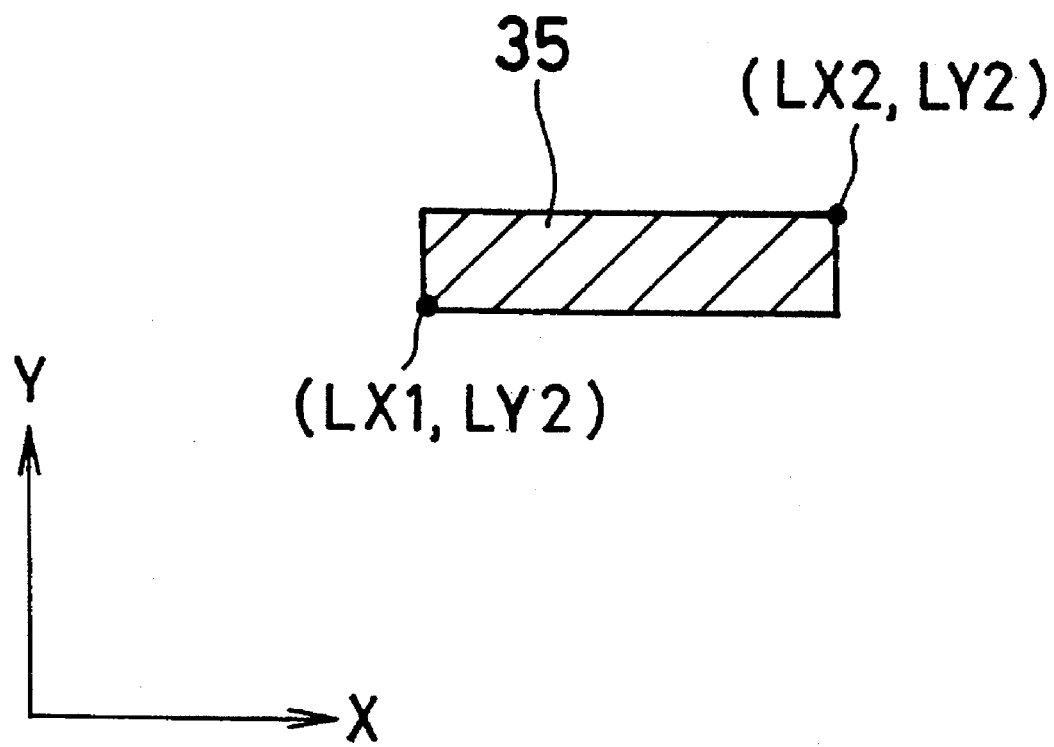
FIG. 8 is a diagram for illustrating a rectangle for a label.

In FIG. 7, it is assumed that the horizontal direction is the x direction, the vertical direction is the y direction, the y coordinates representing the label attributes "task," "gesture," "expression," "head," "eye," "mouth," and "speech" are $Y[1]$, $Y[2]$, $Y[3]$, $Y[4]$, $Y[5]$, $Y[6]$, and $Y[7]$, respectively, the coordinates of the mouse cursor are (MX, MY), the left-most x coordinate on the screen displaying the label is LEFT, the right-most x coordinate is RIGHT, the left-most frame displayed in the frame window 36 is START FRAME, and the right-most frame is END FRAME. If the label information being currently displayed has the i-th label attribute with the start and end frames of st and ed, then, as shown in FIG. 8, the position of the label, that is, the left-most coordinate of LX1, the right-most of LX2, the lowermost of LY1, and the uppermost of LY2, can be found by the following expression:

LX1=(st−START FRAME)/(END FRAME−START FRAME)*(RIGHT−LEFT)+LEFT
if (LX1<LEFT) then LX1=LEFT
LX2=(ed−START FRAME)/(END FRAME−START FRAME)*(RIGHT−LEFT)+LEFT
if (LX2<RIGHT) then LX2=RIGHT
LY1=Y[1]−A
LY2=Y[2]+A.

"A" determines the width of the rectangle in the vertical direction. "A" is a value depending on the size of display, and is here assumed to be A=2.

The following expressions are satisfied by the mouse cursor 41:
LX1<MX<LX2, and LY1<MY<LY2.

Figure 10:
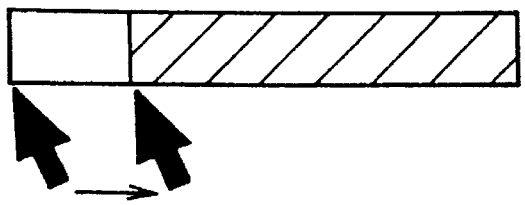
FIG. 10 is a diagram for illustrating the operation of a mouse for a label.
Figure 10:
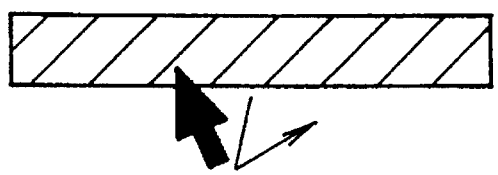
Figure 10C:
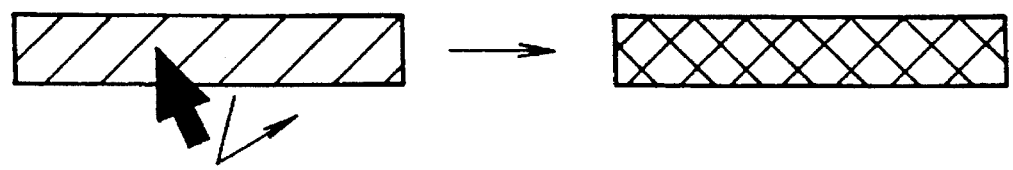
Figure 11A:
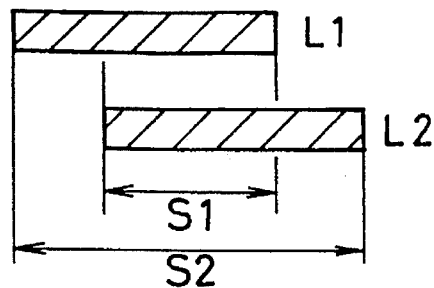
FIG. 11 is a diagram for illustrating a search region according to the present invention.
Figure 11B:
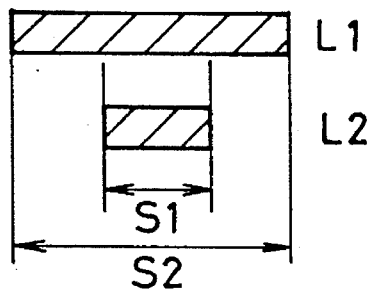
Figure 11C:
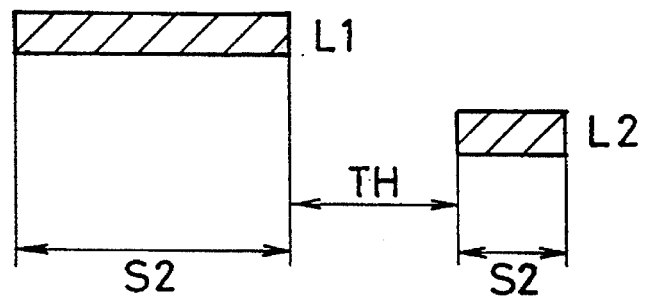
Figure 11D:
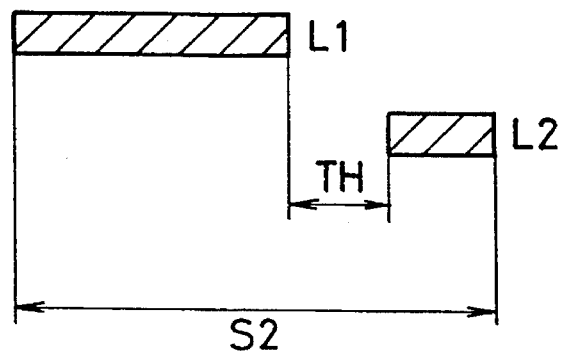

Under this condition, pressing of the button of the mouse 11 is detected, and the start and end frames of the label are sent to the control section 106 for reproduction of the data. For example, as shown in FIG. 10 (b), it is possible to reproduce the speed and moving image data attached with a label simply by clicking that label with the mouse.

When the mouse cursor 41 is in the label information window 34, the position of the mouse cursor 41 is continuously detected to output the speech and image in the frame corresponding to that obtained from the following expression:

frame=(MX−LEFT)/(RIGHT−LEFT)*(END FRAME−START FRAME)+START FRAME

Figure 9A:
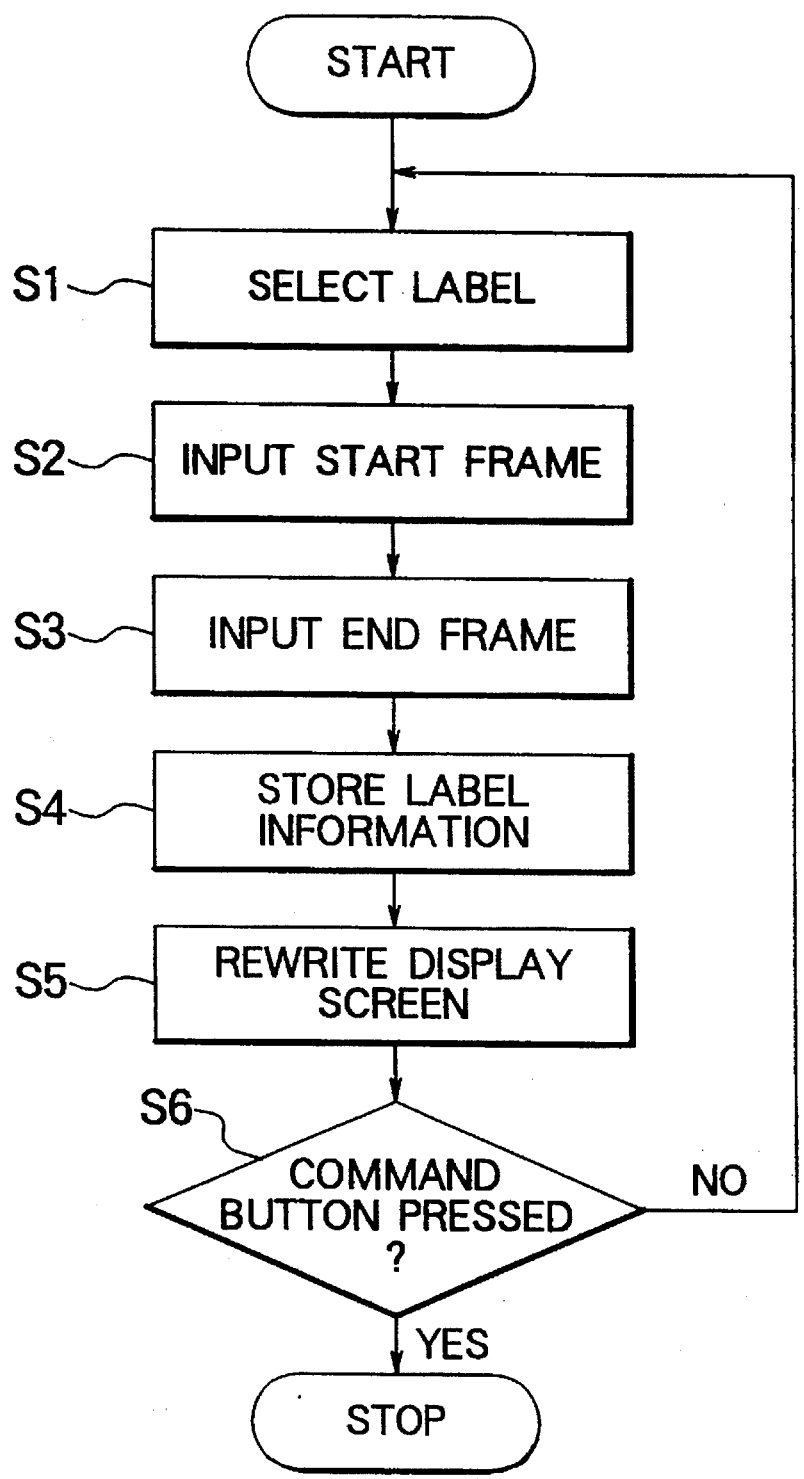
FIG. 9a is a flowchart showing the procedure for a label.

The procedure for executing a command will be described with reference to the flowchart shown in FIG. 9a in the following sections.

The mouse 11 is moved to position the mouse cursor 41 on the Add button in the command window 39 where the mouse button is pressed. At the moment, the Add button changes its color to the selected state color different from that in the normal state so that one can easily detect that that button has been selected.

Then, the mouse cursor 41 is moved to a label of the label select buttons 40 desired for labeling, and the mouse button is pressed (step S1). At the moment, the selected label changes its color to the selected state color. Thereafter, the mouse button is pressed at the start frame (step S2), the mouse cursor 41 is dragged while pressing the mouse button, and the mouse button 41 is released at the end frame (step S3). While the mouse is being dragged, a rectangle is drawn from the start frame to the frame currently pointed by the mouse cursor 41 at the position of the y coordinate specific to the selected label attribute. Further at the same time, the image at that moment is reproduced. The information on the label name, the start frame, and the end frame thus input is stored in the magnetic disk 13 as the label information storage 103 (steps S4 and S5). The label select buttons 40 maintains the currently selected state until a button other than currently selected one is pressed. Therefore, two or more buttons cannot be simultaneously selected. When the Add button is pressed again, or another command button 39 is pressed, the process terminates (step S6). At the moment, the color of Add button returns to the original one from the selected state one.

Figure 9B:
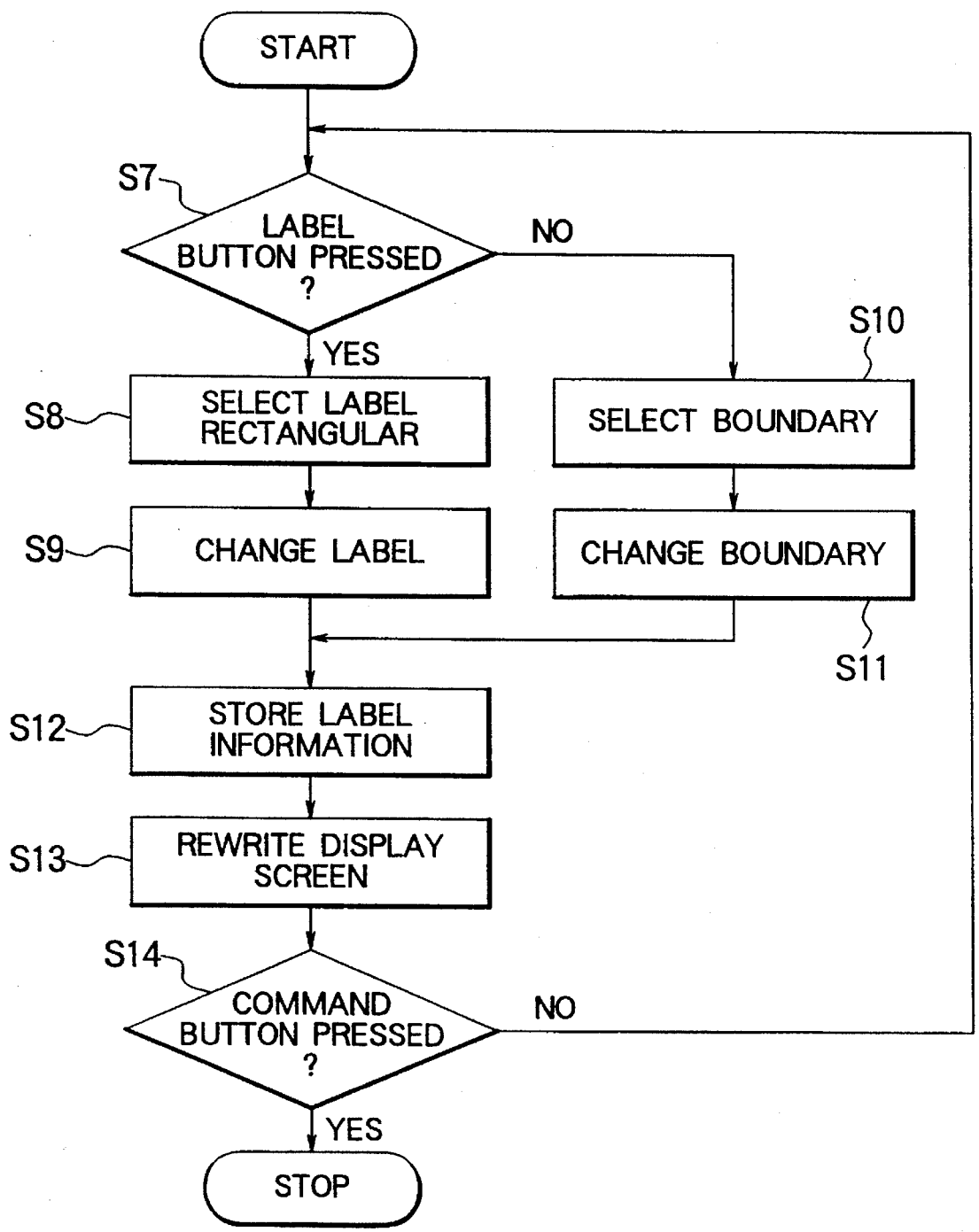
FIG. 9b is a flowchart showing the procedure for a label.

The operation for change of one or more of the label name, start frame, and end frame of the label information previously input will be described with reference to the flowchart shown in FIG. 9b in the following sections.

When the Modify button of the command buttons 39 is pressed, it changes its color to the selected state color. When the label name is changed, the label select button 40 for the label number to be changed is pressed (step S7), and then, the rectangle for the label to be changed in the label information window 34 is pressed (step S8). This causes the label name to be changed to a new one (step S9). If the label attribute selected by the label select button 40 fails to match the attribute of the label selected in the label information window 34, the rewriting of the label name does not occur. When the start or end frame is changed, as shown in FIG. 10 (a), the start or end frame which is a boundary of the rectangle for the label to be changed is pointed by the mouse cursor 41 (step S10), and dragged to an intended frame where the mouse button is released (step S11). The information on the label name, the start frame, and the end frame thus modified is stored in the magnetic disk 13 in place of the previous information (step S12). In this case, the display screen is rewritten (step S13). The label select buttons 40 maintain the currently selected state until a button other than currently selected one is pressed. Therefore, two or more buttons cannot be simultaneously selected. When the Modify button is pressed again, or another command button 39 is pressed, the process terminates (step S14). The color of the Modify button returns to the original one from the selected state color.

Figure 9C:
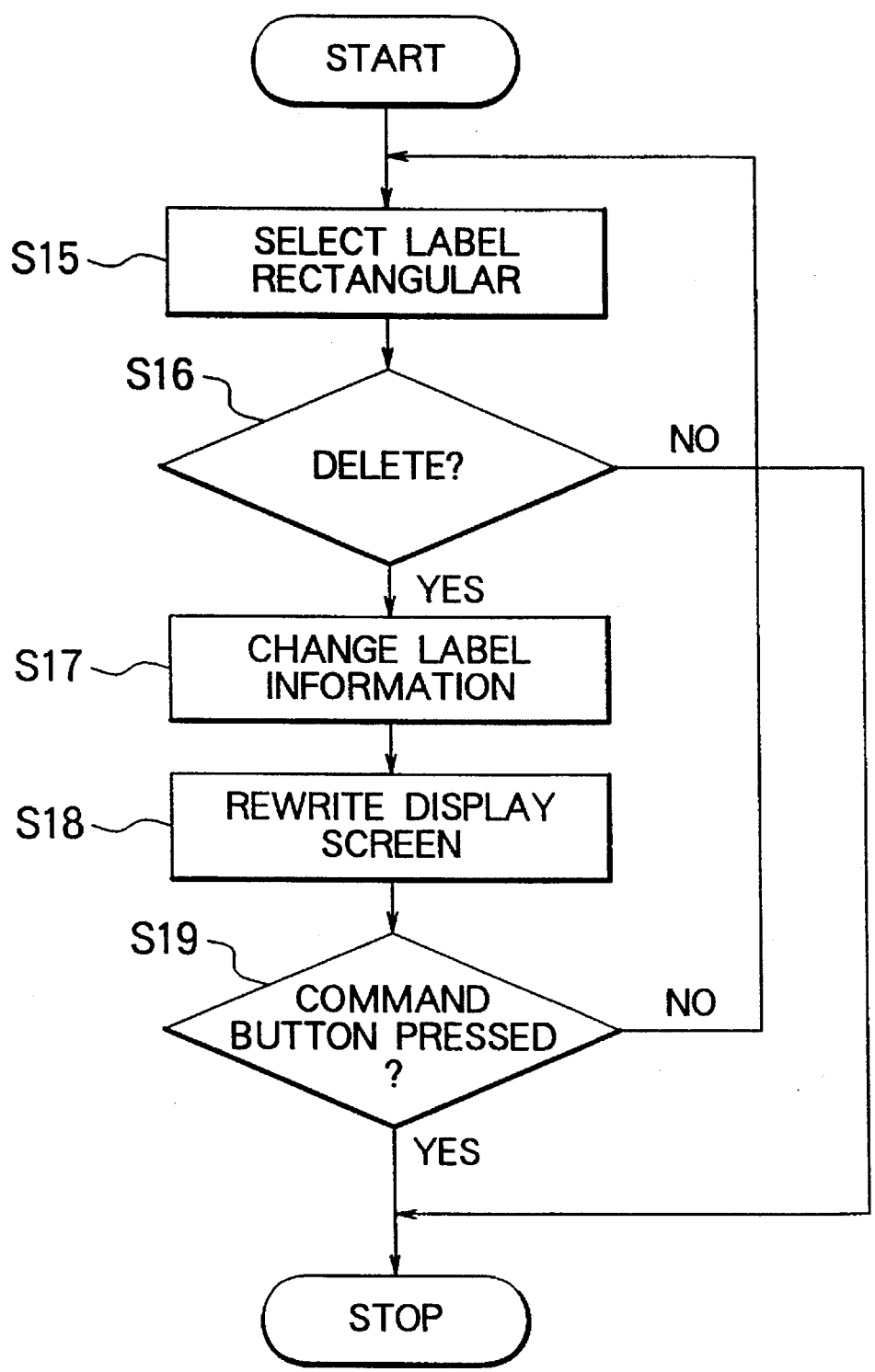
FIG. 9c is a flowchart showing the procedure for a label.

The operation for deleting the previously input label information will be described with reference to the flowchart shown in FIG. 9c in the following sections.

When the Delete button of the command buttons 39 is pressed, it changes its color to the selected state color. The mouse cursor 41 is moved to the rectangle for the label to be deleted from the label information window 34, and the mouse button is pressed (step S15). Then, the control section 106 issues a signal confirming the deletion of the label to the display 15. If the deletion of the label is acknowledged (step S16), the information for that label is deleted from the label information storage 103 (step S17). In this case, the display screen is rewritten (step S18). When the Delete button is pressed again, or another command button 39 is pressed, the process terminates (step S19). The color of the Modify button returns to the original one from the selected state color. If the deletion of the label is not acknowledged in step S16, the operation for the deletion is terminated.

Figure 9D:
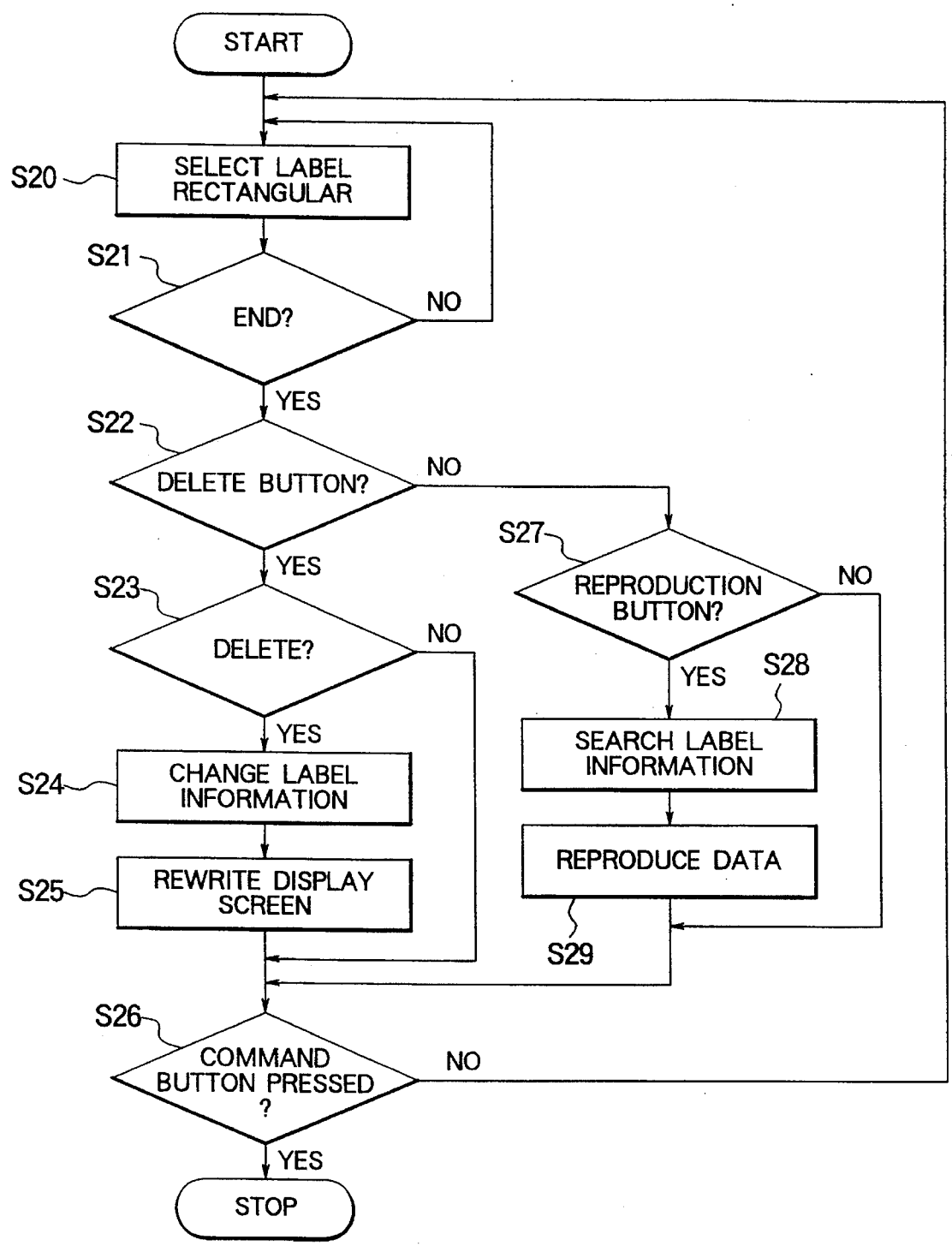
FIG. 9d is a flowchart showing the procedure for a label.

The operation to select, simultaneously delete, or sequentially reproduce a plurality of label information will be described with reference to the flowchart shown in FIG. 9d in the following sections.

When the Select button of the command buttons 39 is pressed, it changes its color to the selected color. When a plurality of label information is simultaneously deleted, the mouse cursor 41 is sequentially moved to the rectangles for the plurality of labels to be deleted from the label information window 34, where the mouse button is pressed (steps S20 and S21). At the moment, the selected labels change their color to the selected state color as shown in FIG. 10 (c). When the Delete button of the command buttons 39 is pressed (step S22), the control section 106 issues a signal confirming the deletion of the plurality of labels to the display 15. If the deletion of the labels is acknowledged (step S23), the information for those labels is deleted from the label information storage 103 (step S24). In this case, the display screen is rewritten (step S25). When the Select button is pressed again, or another command button 39 is pressed, the process terminates (step S26). The color of the Select button returns to the original one from the selected state color. If the deletion of the labels is not acknowledged in step S23, the deletion is terminated.

When a plurality of labels are sequentially reproduced, the mouse cursor 41 is sequentially moved to the rectangles for the plurality of labels to be reproduced, where the mouse button is pressed (steps S20 and S21). At the moment, the selected labels change their color to the selected state color as shown in FIG. 10 (c). When the reproduction button of the operation buttons 38 instead of the Delete button of the command buttons 39 is pressed (steps S22 and S27), the search section 102 searches for label information (step S28). The selected label information is sequentially reproduced (step 29). When the Select button is pressed again, or another command button 39 is pressed, the process terminates (step S26). The color of Select button returns to the original one from the selected state color.

The search for labels between a plurality of attributes is described in detail with reference to FIG. 11.

When two labels with different attributes L1 and L2 are assumed, the labels for attributes are arranged in the vertical direction. The horizontal direction represents time in a unit of frame. When an overlapped section of these two labels is AND-searched, a region S1 is provided. The region S1 becomes subject to the reproduction of speech and images. Similarly, a section containing either one of two labels is OR searched and a region S2 is provided. The region S2 becomes subject to the reproduction of speech and images.

For example, as shown in FIG. 11 (a), when it is assumed that L1 is a label for "nod," while L2 is a label "hai" (meaning "yes"), the region S1 represents an interval from the moment to start "hai" to the moment to end "nod," while the region S2 represents an interval from the moment to start "nod" to the moment to end saying "hai."

In the case of FIG. 11 (b), the region S1 represents an interval during "nodding" and saying "hai"(meaning yes), while the region S2 represents the entire interval of "nodding."

In the case of FIG. 11 (c), there is no overlapping in time between the labels L1 and L2, and TH in the figure is larger than a predetermined value determined by the relationship between the label L1 "nod" and the label L2 "hai"(meaning "yes"). This means that there is no relationship between "nod" and the subsequent "hai." In this case, there is no region S1 searched by the AND search. The region S2 being OR searched is searched for the two position positions as shown. Here, "hai" is reproduced after "nod" is reproduced.

In the case of FIG. 11 (d), there is no overlapping in time between the labels L1 and L2, and TH in the figure is smaller than a predetermined value determined by the relationship between the label L1 "nod" and the label L2 "hai"(meaning "yes"). This means that there is some relationship between "nod" and the subsequent "hai," and it is necessary to simultaneously search for them. In this case, there is no region S1 being AND searched. The region S2 being OR searched is a region combining both of them as shown in the figure. Here, "nod" is reproduced, and its reproduction is continued even when "hai" is reproduced.

In these examples, AND or OR search which is a technique for inputting and searching for a label is specified through the keyboard 10 or the mouse 11.

The broader term of label will be described in the following sections.

The broader term, as shown in Table 1, means an event which can be represented by the relationship of the occurrence of a plurality of labels, and can be extracted by an AND or OR search. For example, a broader term "agree" is a region extracted by OR-searching for the label name "hai" (meaning "yes") for the label attribute "speech" and the label name "nod" for the label attribute "gesture." This originates in the fact that, when a person "agrees," he or she expresses either or both "hai" speech and a "nod" gesture.

TABLE 1

| BROADER TERM | LABEL ATTRIBUTE | LABEL NAME | SEARCH SPECIFI-CATION |
|---|---|---|---|
| AGREE | SPEECH GESTURE | YES NODDING | OR SEARCH |
| DISAGREE | SPEECH GESTURE | NO SHAKE ONE'S HEAD | OR SEARCH |
| — | — | — | — |

An embodiment of the second speech and moving image search apparatus of the present invention will be explained with reference to the drawings.

Figure 12:
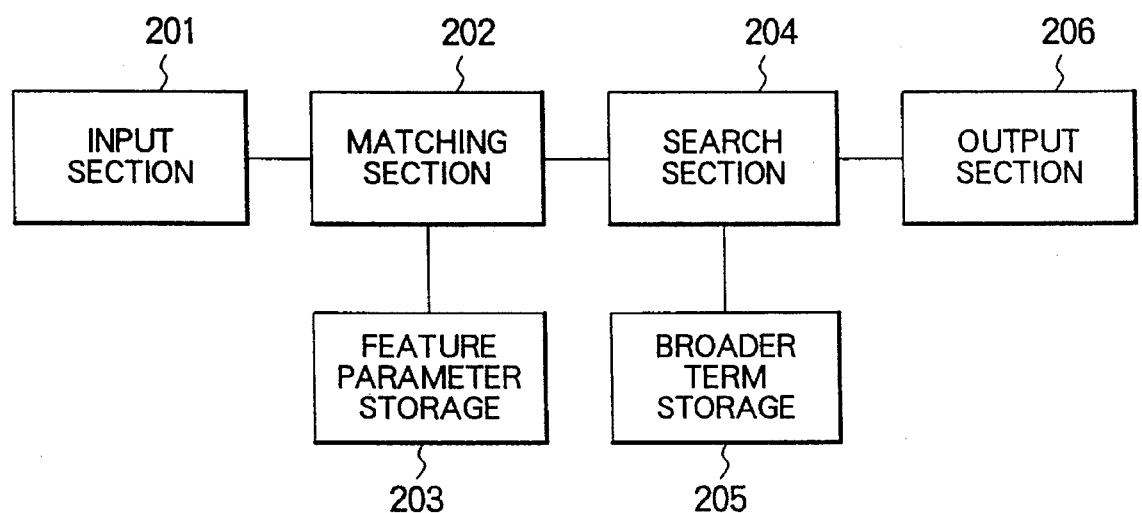
FIG. 12 is a block diagram showing the arrangement of a second speech and moving image search apparatus according to the present invention.

The embodiment includes, as shown in FIG. 12, an input section 201 as an input (for example) for inputting speech and moving image data; a feature parameter storage 203 as a feature parameter storage (for example) for storing feature parameters of prelabeled data; a matching section 202 as a matching means (for example) for comparing the speech and moving image data input from the input section 201 with the feature parameters stored in the feature parameter storage 203, and for outputting a label name attached to a feature parameter which has the largest similarity and is larger than a predetermined threshold; a broader term storage 205 as a broader term storage means (for example) for storing broader terms for labels; a search section 204 as a second search means (for example) for searching for the broader terms stored in the broader term storage 205 from time series data of the label name of each label attribute obtained by the matching section 202; and an output section 206 as an output means (for example) for outputting the result searched for by the search section 204.

The operation of this embodiment is described.

Figure 13:
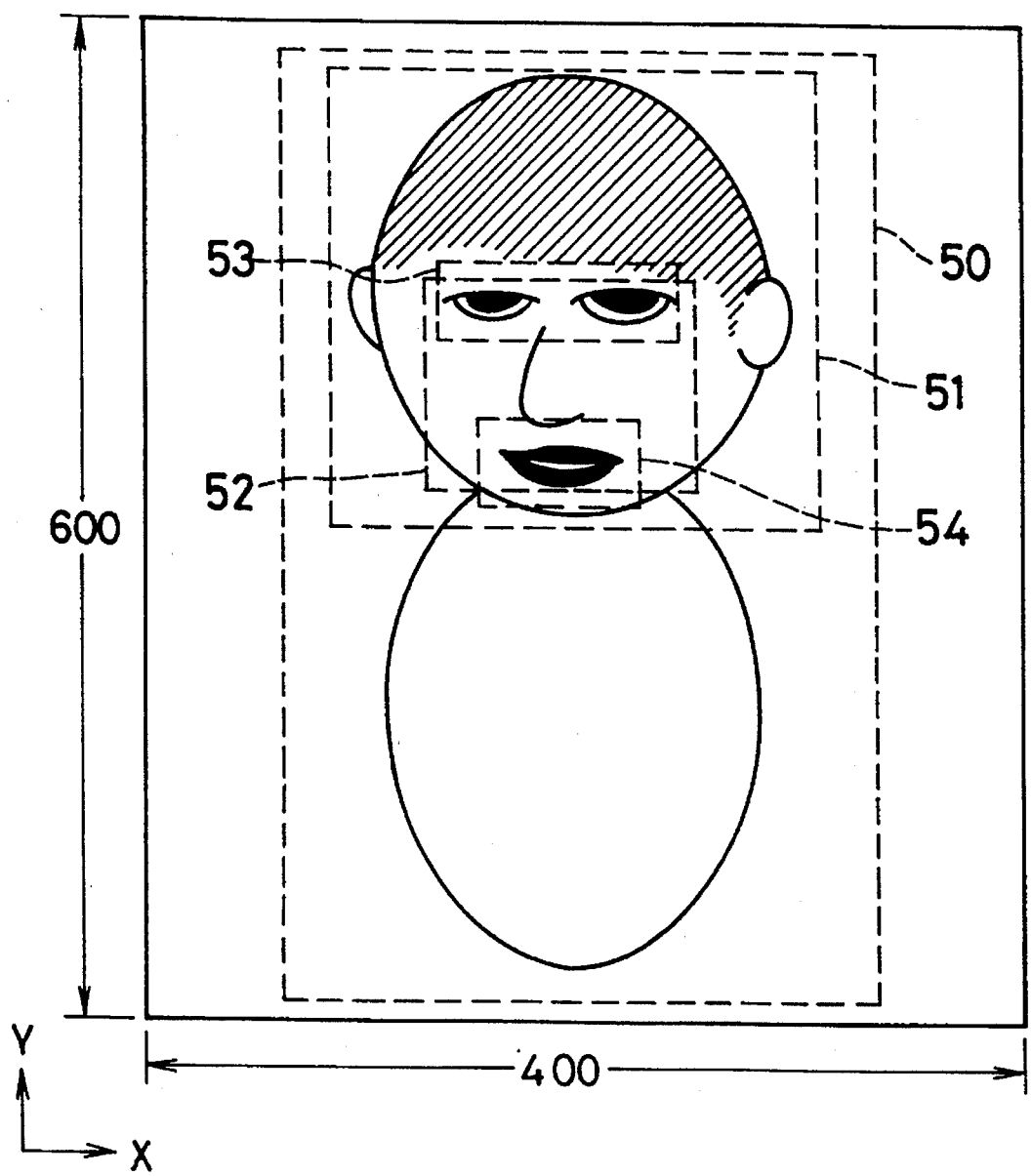
FIG. 13 is a diagram showing various regions of an image.
Figure 14:
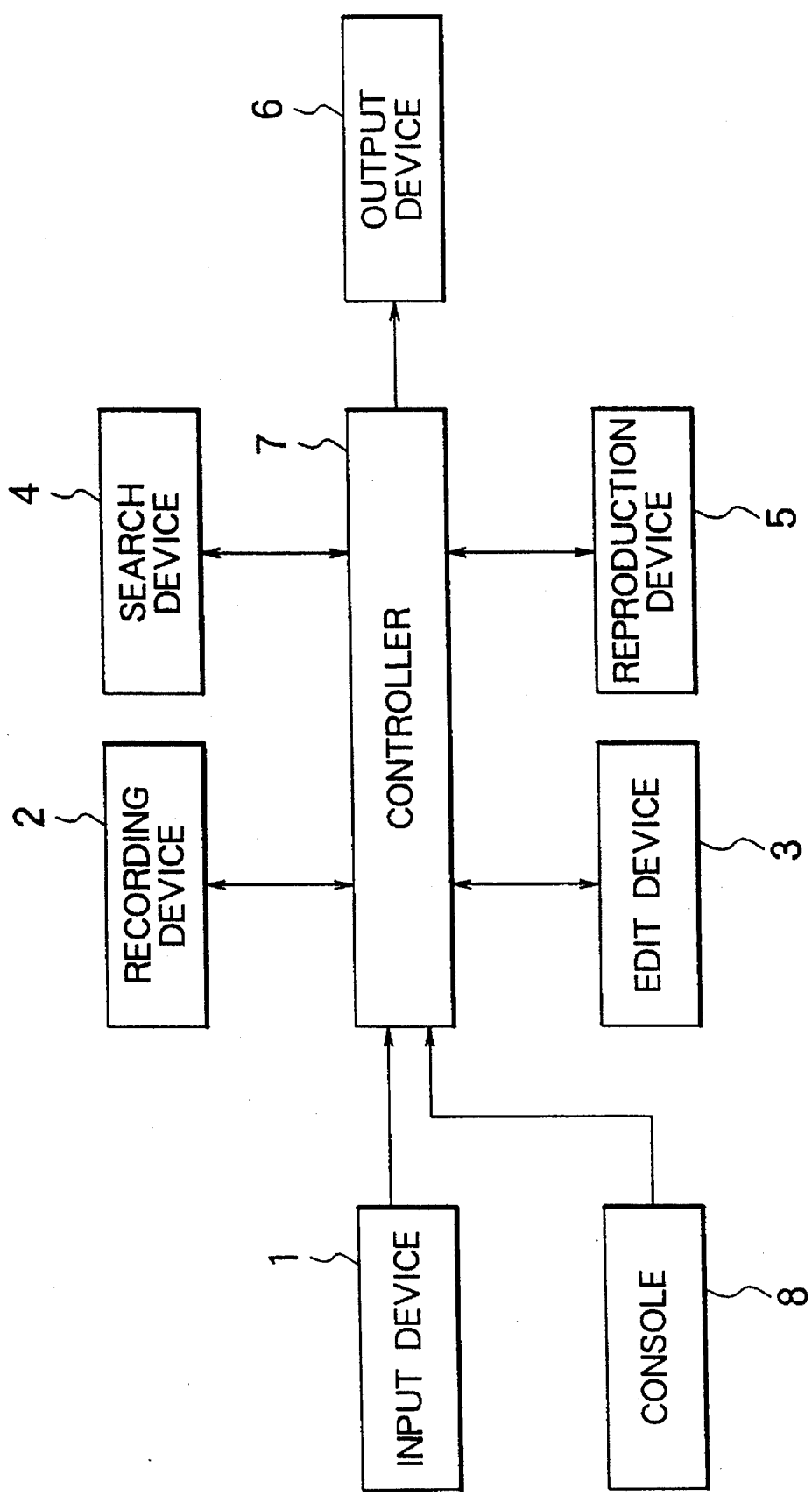
FIG. 14 is a block diagram showing a conventional recording/reproduction/editing apparatus for images and speech.

Similar to the embodiment of the first speech and moving image search apparatus described above, the feature parameters for each label are extracted in this embodiment. The extraction is performed, for example, as shown in FIG. 13, for a whole body region 50, a head region 51, a face region 52, an eye region 53, and a mouth region 54. Table 2 shows which attribute relates to which region.

TABLE 2

| ATTRIBUTE NAME | REGION NAME | COORDINATES |
|---|---|---|
| GESTURE | WHOLE BODY REGION | (50,10,350,590) |
| EXPRESSION | FACE REGION | (150,400,250,500) |
| HEAD | HEAD REGION | (80,350,320,570) |
| EYE | EYE REGION | (160,450,240,500) |
| MOUTH | MOUTH REGION | (180,320,220,350) |
| SPEECH | MOUTH REGION | (180,320,220,350) |

For example, features such as "bow," "nod," "look" (looking memo), and "pointing" relating to the label attribute "gesture" are extracted from the whole body region 50.

Features such as "smile" (smiling), "angry," "laugh" (laughing), and "confuse" (confused) relating to the label attribute "expression" are extracted from the face region 52.

Features such as "left," "right," "up," "down," and "center" relating to the label attribute "head" are extracted from the head region 51.

Features such as "contact" (looking at the other person) and "eclose" (the eyes being closed) relating to the label attribute "eye" are extracted from the eye region 53.

Features such as "mopen" (the mouth being opened) and "mclose" (the mouth being closed) relating to the label attribute "mouth" are extracted from the mouth region 54.

Features such as "irasshai" (meaning "welcome" in Japanese), "hai" (meaning "yes" in Japanese), "iie" (meaning "no" in Japanese"), and "arigatou" (meaning "thanks" in Japanese) relating to the label attribute "speech" are extracted from the mouth region 54. Here, results of frequency analysis on speech waveform for the label attribute "speech" are also stored as feature parameters.

Each region is represented, as shown in Table 2, by average coordinates obtained from many data items assuming that the position of a person recorded in the image data moves little. The values of coordinates are expressed in the sequence of left-most, lowermost, right-most, and uppermost.

As described, the feature parameters extracted from each region are time series data in the label interval, which data is previously stored in the feature parameter storage 203. When speech and moving images are input from the input section 201, they are matched with all feature parameters stored in the feature parameter storage 203 by the matching section 202. In this case, a technique such as dynamic programming is used, and the most similar label for each label attribute is obtained together with the frame value for the interval being matched. From the time series of labels thus obtained, similar to the first embodiment described above, the broader terms stored in the broader term storage 205 are searched for by a specified search device, and the results are output by the output section 206

Many widely different embodiments of the present invention may be constructed without departing from the spirit and scope of the present invention. It should be understood that the present invention is not limited to the specific embodiments described in the specification, except as defined in the appended claims.

What is claimed is:

1. A speech and moving image search apparatus for searching for data of speech and moving images, comprising:

a database for storing said speech and moving image data by frames as a minimum time unit;

label attribute storage means for storing attribute information of labels, which are for labeling the speech and moving image data stored in said database;

label information storage means for storing label information, associating said stored speech and moving image data to a plurality of different events based on the attribute information of labels stored in said label attribute storage means;

broader term storage means for storing broader terms used for searching said label information by an OR or AND search operation;

input means for inputting a command for specifying a stored broader term;

search means for searching for label information from said label information storage means based on the specified broader term stored in said broader term storage means in response to said input command;

controller means for accessing said database to access speech and moving image data corresponding to the label information searched for by said search means; and output means for outputting the speech and moving image data accessed from said database.

2. A speech and moving image search apparatus as claimed in claim 1, wherein a plurality of attributes are provided as the stored attribute information.

3. A speech and moving image search apparatus as claimed in claim 2, wherein said plurality of attributes include gestures of a person, expressions of a person, directions of a head of a person, a line of sight of a person, opening and closing of a mouth of a person, and contents spoken by a person.

4. A speech and moving image search apparatus as claimed in claim 2, wherein said label information storage means stores label information including at least a label attribute name, a starting frame, and an end frame.

5. A speech and moving image search apparatus for searching for data of speech and moving images, comprising:

input means for inputting said speech and moving image data by frames, as a minimum time unit;

feature parameter storage means for storing feature parameters, each corresponding to prelabeled respective speech and moving image data;

matching means for matching the speech and moving image data input by said input means with a feature parameter stored in the feature parameter storage means, and for outputting labels corresponding to said matched feature parameter only when predetermined conditions are met;

broader term storage means for storing broader terms used for searching said labels by an OR or AND search operation;

search means for accepting said labels output from said matching means, and for searching for broader terms for said labels from said broader term storage means; and output means for outputting said broader terms searched by said search means.

6. A speech and moving image search apparatus as claimed in claim 5, wherein said feature parameters include gestures of a person, expressions of a person, directions of a head of a person, a line of sight of a person, opening and closing of a mouth of a person, and contents spoken by a person.

7. A speech and moving image search apparatus as claimed in claim 6, wherein each of said feature parameters is extracted from a region which is defined by predetermined coordinates of image data of a person.

8. A speech and moving image search apparatus as claimed in claim 5, wherein said feature parameter storage means stores feature parameters including at least a label attribute name, a starting frame, an end frame.

* * * * *